Oct. 3, 1961 W. G. LOHMEYER 3,002,422
ACTUATING MECHANISM FOR CAMERA EQUIPPED WITH ZOOM LENS
Filed Aug. 22, 1960 4 Sheets-Sheet 1
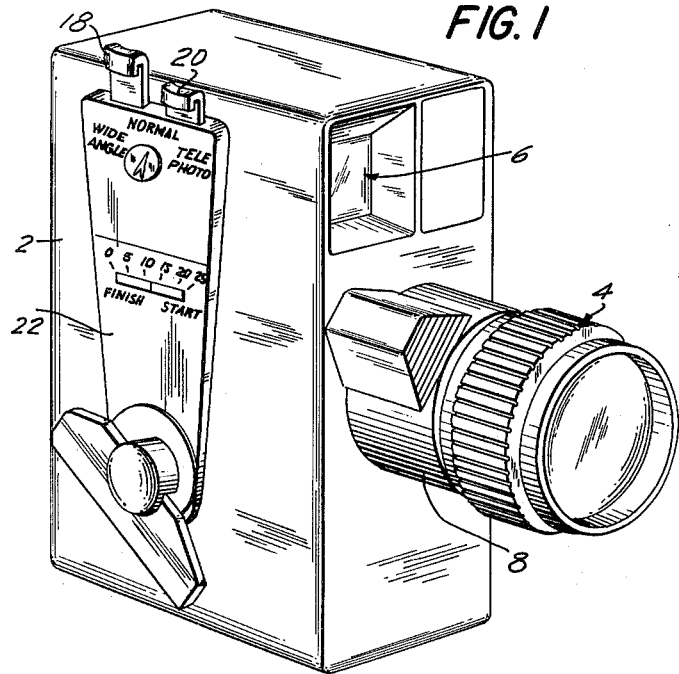
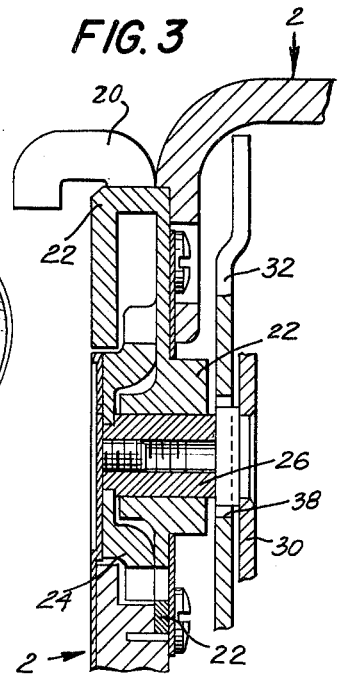
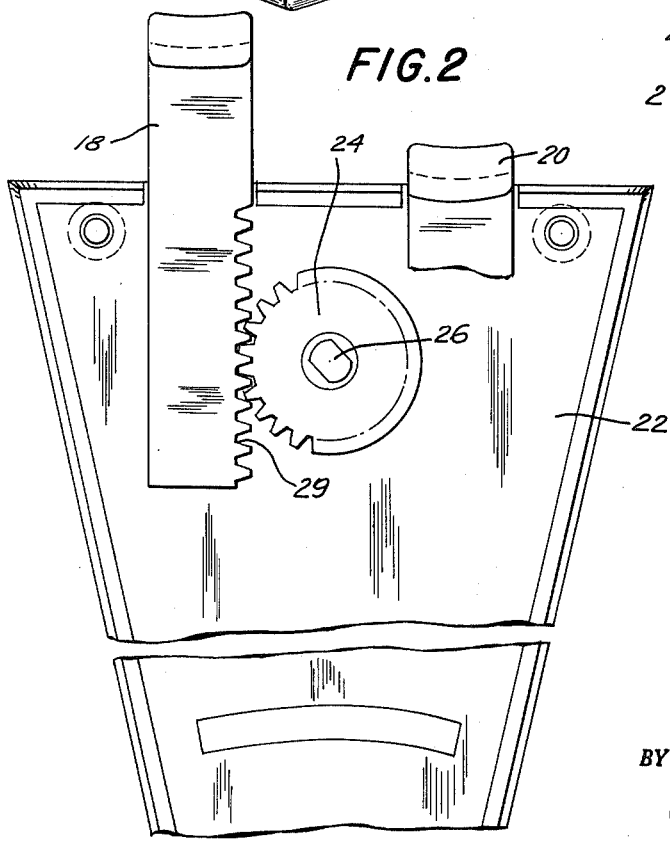
INVENTOR.
WALTER G. LOHMEYER
BY James and Franklin
ATTORNEYS Oct. 3, 1961  W. G. LOHMEYER  3,002,422
ACTUATING MECHANISM FOR CAMERA EQUIPPED WITH ZOOM LENS
Filed Aug. 22, 1960  4 Sheets-Sheet 2
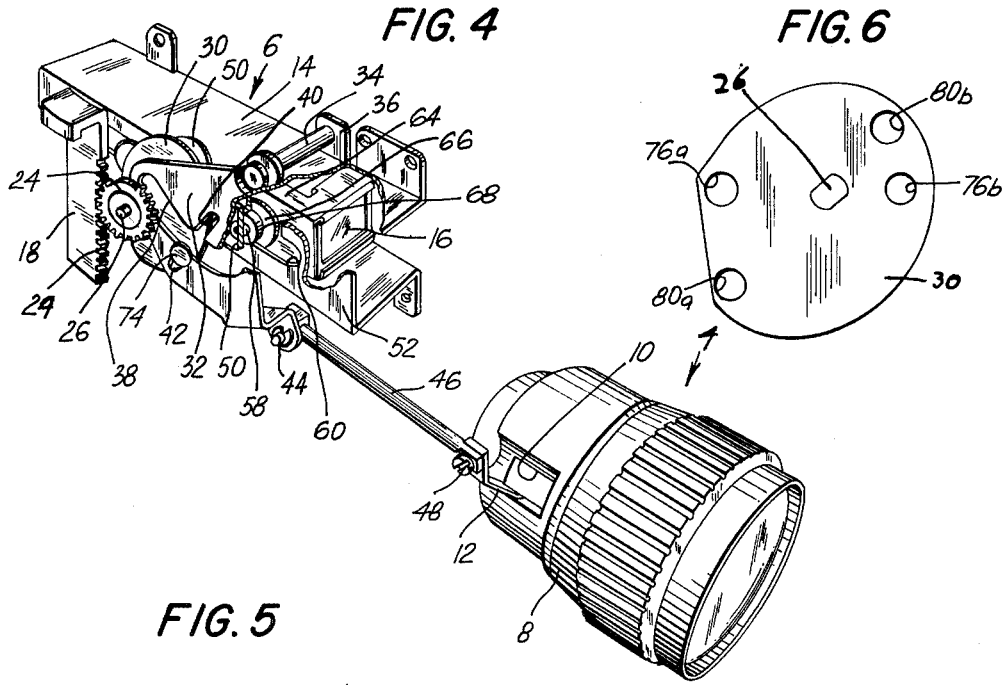
FIG. 4
FIG. 6
FIG. 5
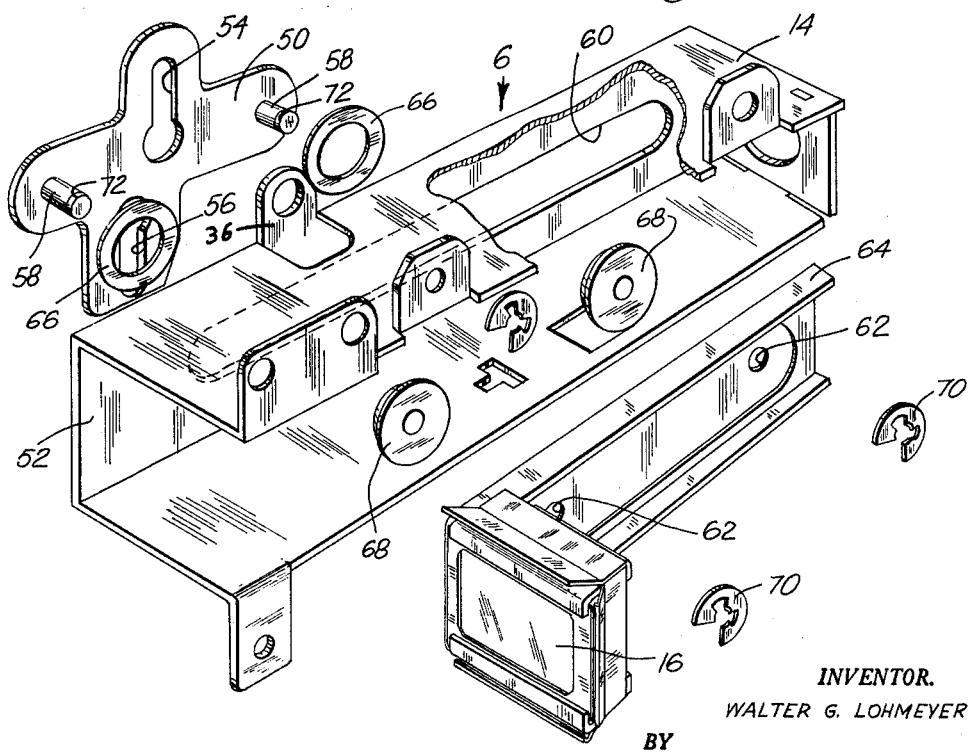
INVENTOR.
WALTER G. LOHMEYER
BY
James and Franklin
ATTORNEYS

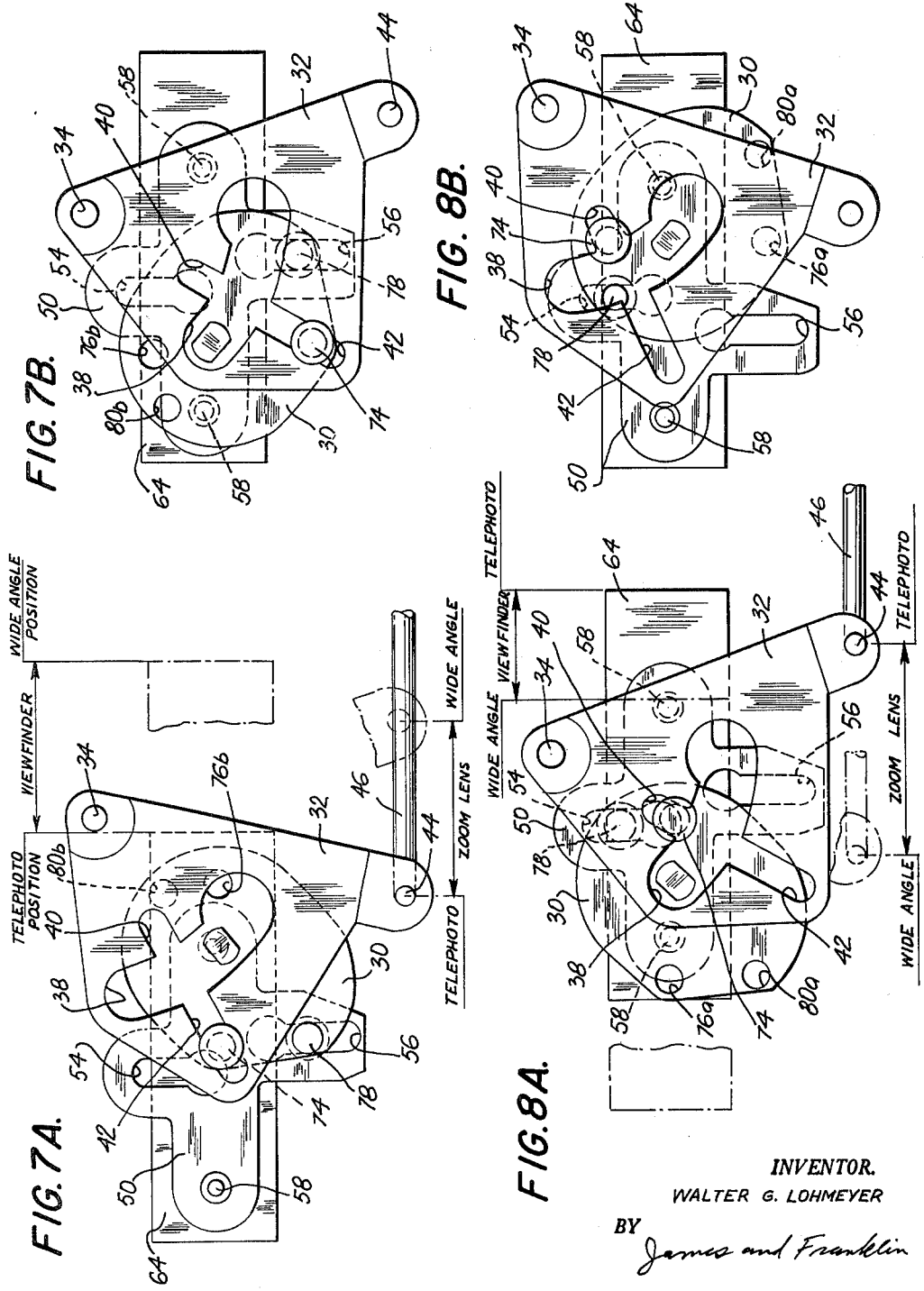

Oct. 3, 1961   W. G. LOHMEYER   3,002,422
ACTUATING MECHANISM FOR CAMERA EQUIPPED WITH ZOOM LENS
Filed Aug. 22, 1960   4 Sheets-Sheet 4
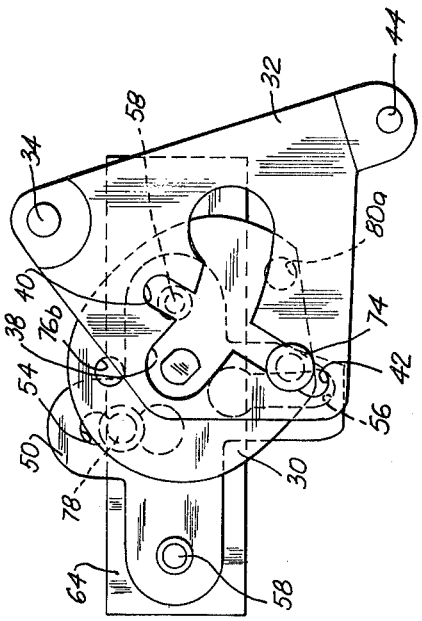
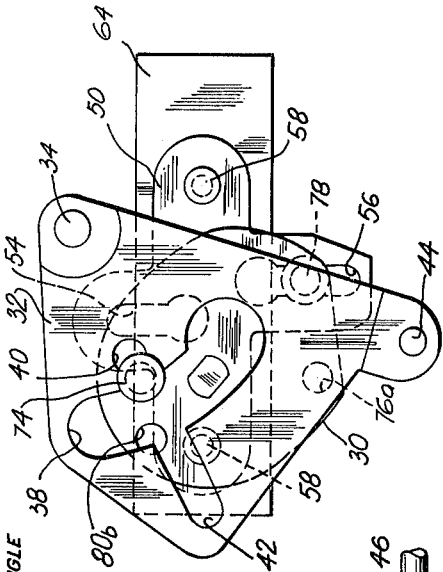
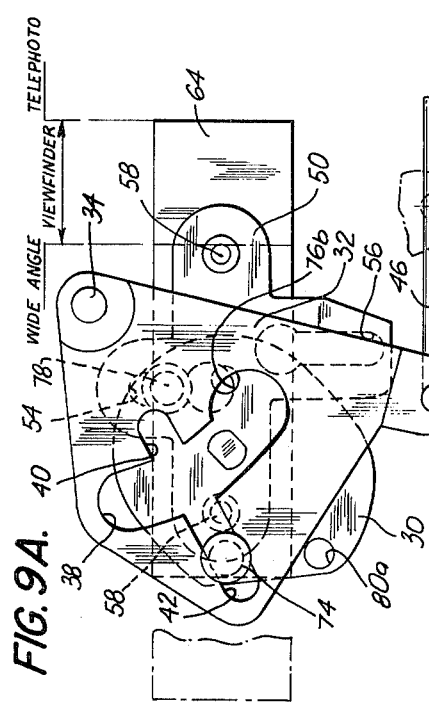
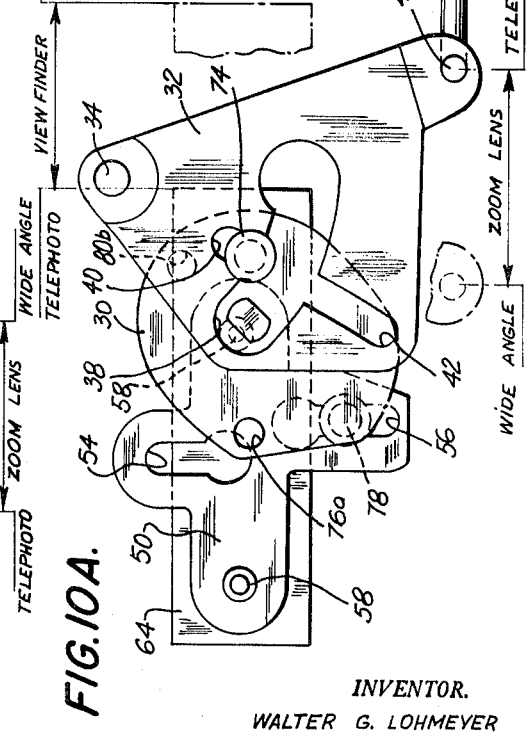
INVENTOR.
WALTER G. LOHMEYER
BY
James and Franklin
ATTORNEYS

United States Patent Office 3,002,422
Patented Oct. 3, 1961

3,002,422
ACTUATING MECHANISM FOR CAMERA
EQUIPPED WITH ZOOM LENS
Walter G. Lohmeyer, Northport, N.Y., assignor to Dejur-Amsco Corporation, Long Island City, N.Y., a corporation of New York
Filed Aug. 22, 1960, Ser. No. 50,949
21 Claims. (Cl. 88—16)

The present invention relates to mechanism for manually actuating adjustable optical elements in a camera, and is specifically adapted to the control of vari-focal or zoom lenses, and the coordinated control of view finders in conjunction therewith.

The use of vari-focal or zoom type lenses is becoming more and more prevalent, particularly in motion picture cameras, in large part because of the more ready availability of such lenses at reasonable cost. The ease and facility with which interesting photographic effects can be produced with such lenses is an important factor in their success and in the demand therefor. However, the very versatility of these lenses presents problems of its own. If the lens is set for a close-up and the photographer thinks he is taking a wide-angle picture, or vice versa, the results will be far from satisfactory, and often utterly useless. The best way to keep the photographer constantly apprised of the instaneous condition of his zoom lens is to ensure that the view in the view finder always corresponds more or less accurately to the field of view for which the lens is set. The camera is therefore usually equipped with an adjustable view finder as well as with a zoom lens, and means must be provided for simultaneous and correspondingly adjusting both the view finder and the zoom lens.

Zoom lenses and adjustable view finders as well are provided with optical elements which are relatively movable in order to vary the optical characteristics thereof. However, different zoom lenses (and different adjustable view finders) vary in design and operating characteristics. Thus in one make of zoom lens the movable optical element may move forwardly in going from telephoto to wide angle condition, while in another make of zoom lens the movable optical element may move rearwardly to accomplish the same change in characteristics. Indeed, the actual distances through which the optical elements are to be moved differ as between different makes or designs. The same is true of adjustable view finders.

Since the same zoom lens (or adjustable view finder) may not always be used with a given camera, either because of the personal preferences of the photographer or because of the lack of availability of certain lenses or view finders to the manufacturer at any given time, it becomes desirable to provide, in a motion picture camera or the like, a mechanism for actuating the zoom lens (and the adjustable view finder, if present) to desired condition, which mechanism may be used to control and adjust zoom lenses (and adjustable view finders) of different designs and operating characteristics. In this way a single linkage may be employed which is capable of universal, or substantially universal, use, no matter what make or design of zoom lens (or adjustable view finder) is involved. This it is a prime object of the present invention to accomplish.

One of the primary advantages of a zoom lens, when used with a motion picture camera or other continuously photographing device, is that the change in focal length of the lens, with a corresponding change in the type of picture taken, can be accomplished without interruption in the continuity of the photographic operation. However, in order that this can be accomplished readily and effectively the means for adjusting the condition of the zoom lens must be easily accessible to and readily manipulatable by the photographer. This is particularly true in the case of portable motion picture cameras which are held in the hand while pictures are being taken. If the attention of the photographer must leave the scene which is being photographed in order to adjust the zoom lens, or if the operation of the adjusting mechanism involves a manipulation which tends to disturb the position of the camera, then the quality of the photograph will suffer adversely. It is a further prime object of the present invention to devise an actuating mechanism for control of the zoom lens (together with an adjustable view finder, if desired) which may readily be manipulated by the photographer in a positive manner without adversely affecting the aiming, support or other control of the camera.

In accordance with these prime objectives, the lens (and view finder) actuating mechanism comprises a driving member which is rigidly connected to a pair of operating elements in the form of finger pieces accessible on the outside of the camera casing, those finger pieces simultaneously moving in opposite directions as the driving member is moved. Since the photographer can readily apply pressure simultaneously to both of these finger pieces he can closely control the condition of the zoom lens and adjust it to any condition which he might desire at whatever speed appears appropriate. The finger pieces may be conveniently located on the camera casing so as to not only permit, but also encourage, the holding of the camera by the photographer in the most effective manner.

Linkages are provided extending from the zoom lens (and the adjustable view finder if provided) to the driving member. These linkages are adapted to be connected to the driving member by connecting elements which are selectively positionable in one of a plurality of possible locations relative to the driving member or linkage or both, in order to produce different movements of the linkages for a given movement of the driving member. Thus movement of the driving member in a given direction may, depending upon the location of the connecting element, cause the linkage to move in one direction or another and for one distance or another, corresponding to the design characteristics of the particular zoom lens or adjustable view finder which may be involved. Since the finger pieces are connected to the driving member the same movement of the finger pieces, both as to direction and distance, will cause the zoom lens to move from one given selected condition to the other independently of the direction and distance which the lens-connected linkage must be moved.

As a result basically the same operating mechanism can be employed for use with different types and styles of zoom lenses and adjustable view finders, thus resulting in great convenience and inexpensiveness in manufacture and permitting interchange of zoom lenses and view finders either by the manufacturer or by the photographer, and the particular manipulative action which the photographer must carry out in order to adjust the optical elements between one selected condition and the other will be the same, both in direction and extent, for all types of lenses and view finders.

To the accomplishment of the above, and to such other objects as may hereinafter appear, the present invention relates to actuating mechanism for adjusting camera-carried lenses and view finders, as defined in the appended claims, and as described in this specification, taken together with the accompanying drawings, in which:

FIG. 1 is a three-quarter perspective elevational view of a camera in which the present invention is embodied;

FIG. 2 is an elevational view, on an enlarged scale, of inside of the mounting plate for the driving member of the operating mechanism, the finger pieces being shown fragmentarily;

FIG. 3 is a fragmentary cross sectional view taken along the line 3—3 of FIG. 1;

FIG. 4 is a three-quarter perspective view of the overall operating mechanism for adjusting a zoom lens and an adjustable view finder;

FIG. 5 is a three-quarter perspective exploded view, partially broken away, showing one type of adjustable view finder and the linkage connected thereto for operation thereof;

FIG. 6 is an elevational view of the driving member for the actuating mechanism, showing a plurality of positions at which the connecting elements may selectively be mounted thereon;

FIGS. 7A and 7B are elevational views showing the position which the various parts of the operating mechanism assume for the simultaneous control of a zoom lens and a view finder in which both of the movable optical elements are adapted to be moved forwardly in going from telephoto to wide angle position, FIG. 7A showing the position of the parts for telephoto position and FIG. 7B showing the position of the parts for wide angle position;

FIGS. 8A and 8B are views similar to FIGS. 7A and 7B, except that the optical elements of the zoom lens and the adjustable view finder must be moved in opposite directions, and for different distances, when compared with the corresponding elements of the lens and view finder of FIGS. 7A and 7B;

FIGS. 9A and 9B are similar to FIGS. 8A and 8B but illustrate the position of the parts when the zoom lens of FIG. 7 and the view finder of FIG. 8 are used together; and FIGS. 10A and 10B are similar to FIGS. 7A and 7B except that they show the position of the parts when the view finder of FIG. 7 and the zoom lens of FIG. 8 are used together.

The present invention is here illustrated embodied in a motion picture camera comprising a casing 2 carrying a zoom lens 4 and a view finder 6. The zoom lens 4 is, as is conventional, provided with an internally mounted movable optical element for adjusting the focal length of the lens and thereby varying the condition of the lens between what may be termed telephoto and wide angle conditions. As may best be seen from FIG. 4, the lens 4 is provided with a housing 8 having a slot 10 formed therein and located inside the camera casing 2, a finger 12 extending out through and being slidable along the slot 10, the finger 12 being operatively connected to the movable optical element of the lens 4 in any appropriate manner. The view finder 6 is provided with a housing 14 within which the optical element 16 is slidably mounted, the location of the optical element 16 along the length of the housing 14 controlling the optical characteristics of the view finder 4 so that the view seen therethrough will correspond more or less accurately to the field of view of the lens 4.

For controlling the adjustment of the lens 4 and the view finder 6, a pair of finger pieces 18 and 20 are provided, the upper ends of the finger pieces 18 and 20 being accessible at the exterior of the casing 2, and preferably adjacent the side and upper end thereof. The lower portions of the finger pieces 18 and 20 extend into the interior of the casing 2, behind a cover plate 22, and are appropriately mounted and guided for vertical parallel movement. Located between the lower ends of the finger pieces 18 and 20, and rotatably mounted on the inner surface of plate 22, is gear 24, which is made fast to shaft 26 rotatably mounted in fixed plate 22. The finger pieces 18 and 20 are located on opposite sides of the gear 24 and are provided with rack surfaces 29 which engage with the gear 24. As a result vertical movement of the finger pieces 18 and 20 will cause rotation of the gear 24, downward movement of a given finger piece 18 or 20 resulting in upward movement of the other finger piece 20 or 18.

Inside the casing 2 and mounted fast on the shaft 26 for rotation therewith and with the gear 24, is a disk 30, which constitutes the driving member for the adjustment of the zoom lens 4 and the view finder 6.

The linkage adapted to be driven by the disk 30 and to adjust the condition of the zoom lens 4 comprises a plate 32 pivotally mounted on shaft 34 supported on ears 36 extending up from the view finder housing 14, that plate 32 being provided with an arcuate slot 38 through which the shaft 26 freely passes, and with a pair of approximately vertical slot portions 40 and 42 communicating therewith. The plate 32 is pivotally connected at 44 to a rod 46, which is in turn pivotally connected at 48 to the finger 12.

The linkage adapted to be driven by the disk 30 and to adjust the condition of the view finder 6 by moving the optical element 16 thereof comprises a plate 50 located between the disk 30 and the adjacent side 52 of the view finder casing 14, and therefore on the opposite side of the disk 30 from the plate 32. The plate 50 is provided with a pair of slot portions 54 and 56, and with a pair of pins 58 adapted to extend through a slot 60 in the side 52 of the view finder casing 14 and to be received within apertures 62 in an arm 64 connected to the movable optical element 16 and slidable along the inner surface of the view finder casing 52. Washers 66 are interposed between the wall 52 and the arm 64, and bushings 68 encompass the pins 58, pass through the centers of the washers 66, and engage the inner surfaces of the washers 66. The entire movable assembly is held together by gripping lock washers 70 which are located on the inner surface of the arm 64 and which engage within slots 72 formed adjacent the ends of the pins 58.

The driving member 30 is connected to the linkage which controls the adjustment of the lens 4 by means of a connecting element 74 in the form of a headed stud the shank of which is received within an aperture 76 formed in the disk 30 at an appropriate point thereon (two such apertures, designated 76a and 76b, are disclosed for selective use), that stud engaging with the plate 32 in one or another of the slot portion 40 or 42 thereon, selective engagement of the connecting element 74 with the desired slot portion 40 or 42 being accomplished by passing the head of the connecting element 74 through the slot 38, which is wider than the stud head, and then causing the shank of the stud 74 to enter the appropriate slot portion 40 or 42. Operative connection between the driving member 30 and the linkage for the view finder 6 is similarly accomplishd by means of a connecting element 78, also in the form of a headed stud the shank of which is received within an appropriately located aperture 80 in the disk 30 (two such apertures, designated 80a and 80b, are disclosed for selective use). The stud 78 is adapted to be received in one or the other of the slot portions 54 or 56 in the plate 50, being engaged therewith by having its head passed through a part of the appropriate slot portion, which is of approximately keyhole shape, the shank of the stud 78 thereafter being moved into the narrower part of the appropriate slot portion 54 or 56.

The mode of operation of the disclosed linkage will in the main be apparent from the above description. As the finger pieces 18 and 20 are moved up and down the gear 24 will be rotated, the driving member 30 will be rotated, the connecting elements 74 and 78 carried thereby will be moved, and the linkages which adjust the lens 4 and view finder 6 will be correspondingly and simultaneously moved to bring about the desired optical condition of the lens 4 and view finder 6 respectively. Since the finger pieces 18 and 20 are connected together for simultaneous movement in opposite directions, finger tip control of the lens and view finder conditions, without any overrunning may be accomplished at will and with the adjustment made at whatever speed suits the desires of the photographer. The location of the finger pieces 18 and 20 is such that they can be readily manipulated by the first and second fingers of the photographer's right hand while he holds the camera and while his hand is in optimum position for supporting and guiding the camera. Since the view finder 6 is adjusted simultaneously with and corresponding to the condition of the zoom lens 4, the photographer, when he looks through the view finder 6, will at all times be apprised of the condition of the lens 4 merely by observing the field of view which he can see.

A very significant advantage of the linkage here disclosed is that it can readily be adapted for use with different types of zoom lenses and with different types of adjustable view finders. For example, one popular type of zoom lens (hereinafter designated type A) requires forward movement of the finger 12 of the lens 4 in order to adjust the lens from telephoto to wide angle condition, the amount of movement involved being .756 inch. An adjustable view finder made by the same concern (and hence also designated type A) requires the same direction and amount of movement of the movable optical element 16 in going from telephoto to wide angle position. A zoom lens 4 made by a second manufacturer (hereinafter designated type B) calls for movement of the finger 12 in a rearward direction for a distance of .843 inch in going from telephoto to wide angle condition, while an adjustable view finder made by that second manufacturer (and also designated type B) calls for rearward movement of the optical element 16 for the same variation of condition, but by a distance of .476. The operating mechanism here disclosed can readily be adapted for use with any combination of these zoom lenses 4 and adjustable view finders 6, types A and B, merely by providing the driving member 30 with a pair of appropriately positioned apertures 76a and 76b, the first being located for the type A lens and the second being located for the type B lens, and with a pair of appropriately located apertures 80a and 80b, for the types A and B view finders respectively, the appropriate connecting element 74 and 78 being inserted into the appropriate apertures 76a, 76b respectively and 80a, 80b respectively, depending upon the particular type of zoom lens 4 and adjustable view finder 6 which may be used in the camera.

The adaptability of the instant mechanism is illustrated in FIGS. 7–10. FIG. 7 discloses the way in which the parts are connected when used in connection with the type A zoom lens and view finder. The connecting element 74 is inserted into the aperture 76a and is associated with the slot portion 42 on the plate 32. The connecting element 78 is inserted in the aperture 80a in the plate 30 and is associated with the slot portion 56 on the plate 50. FIG. 7A illustrates the position of the parts for telephoto condition, with the driving member 30 rotated fully clockwise, while FIG. 7B shows the position of the parts for the wide angle condition, the driving member 30 being rotated fully counter-clockwise, all as determined by the limits of movement of the finger pieces 18 and 20.

FIGS. 8A and 8B disclose the manner in which the linkage is used with the type B zoom lens 4 and adjustable view finder 6. Here the connecting element 74 is received within aperture 76b and associated with the slot portion 40 in the plate 32, while the connecting element 78 is received within the aperture 80b and is associated with the slot portion 54 on the plate 50. The positions and rotational movement of the driving member 30 between the telephoto and wide angle positions shown respectively in FIGS. 8A and 8B are the same as those in FIGS. 7A and 7B but, it will be noted, the movement of the plates 32 and 50 are different in direction and distance, when going from the telephoto condition of FIG. 8A to the wide angle position of FIG. 8B, when compared with the corresponding movement of those elements in going from the position of FIG. 7A to that of FIG. 7B.

FIGS. 9A and 9B and FIGS. 10A and 10B are similar to FIGS. 7A–8B, except that FIGS. 9A and 9B illustrate the linkage used in connection with a type A zoom lens and a type B view finder, whereas FIGS. 10A and 10B illustrate the manner in which the parts are connected in connection with a type B zoom lens and a type A view finder.

If view finders or zoom lenses of types other than those here specifically disclosed were to be employed, it would be necessary merely to provide different locations for the connecting elements 74 and 78 relative to the driving member 30, or to the linkages controlled thereby, or both. From a practical point of view it will probably be sufficient initially to provide the operating mechanism for selective actuation of two different types of lenses and two different types of view finders, but where required even greater flexibility of operation could be built into the mechanism.

It is noteworthy that a standard mechanism, adapted to be actuated by what may be considered a standard mode of manual manipulation, both as to direction and distance, on the part of the photographer, will operate and adjust optical devices the movable elements of which move in either a forward or backward direction and for varying distances. The specific location of the connecting elements 74 and 78, and the manner by which they control the linkages connected to the optical devices may, of course, be widely varied, as may the specific construction and arrangement of the linkages themselves. Purely by way of example, the stud and slot interconnection between connecting elements 74 and 78 and plates 32 and 50 respectively, which is a species of cam connection, could be replaced by actual cams and cam followers, or by direct connection to the operated linkages. Those linkages themselves could be designed to include rotatable or slidable elements, or even other cams and cam followers. It will therefore be apparent that many departures may be made from the specific structures here disclosed, all within the spirit of the invention as defined in the following claims.

I claim:

1. A camera comprising a casing having a top wall, a zoom lens mounted thereon, lens actuating means operatively connected to said zoom lens for actuating the latter to vary the effective focal length thereof, a pair of finger pieces mounted on said casing, located immediately adjacent one another so as to be manipulatable by the fingers of one hand, and exposed at the exterior of said top wall of said casing for manual manipulation, and means operatively connecting said finger pieces to one another and to said lens actuating means for simultaneous movement of said finger pieces in opposite substantially vertical directions and simultaneous progressive operation of said lens actuating means in accordance with said movement of said finger pieces as that movement progresses, and at a speed positively related to the speed of movement of said finger pieces.

2. The camera of claim 1, in which said finger pieces are mounted on said casing to move in parallel paths.

3. The camera of claim 1, in which said means operatively connecting said finger pieces to one another and to said lens actuating means comprises a gear operatively connected to said lens actuating means for operation of the latter, said finger pieces being operatively located on opposite sides of and gearingly connected to said gear.

4. The camera of claim 3, in which said finger pieces are mounted on said casing to move in parallel paths and are provided with rack portions making direct gearing connection to said gear.

5. The camera of claim 3, in which said finger pieces are mounted on said casing to move in parallel paths vertically disposed relative to said casing and are provided with rack portions making direct gearing connection to said gear.

6. In a camera comprising a casing, a zoom lens having a movable element for changing the focal length thereof, and a linkage operatively connected to said zoom lens element for adjustably varying the condition of said zoom lens; the improvement which comprises said linkage comprising a driving member adapted to be adjustably positioned, a driven member operatively connected to said zoom lens element for altering the condition of said zoom lens, a connecting element operatively connected between said driving member and said driven member, said operative connection between said connecting element and said members comprising engageable and disengageable parts including a plurality of selectively usable parts on one of said members which are respectively positioned at a plurality of locations thereon, thereby to produce different positioning of said zoom lens element in accordance with given positioning of said driving member depending upon which of said selectively engageable parts is operative.

7. The camera of claim 6, in which said driving member is movable between first and second positions and said selectively usable parts on said one of said members are so positioned thereon as to be moved in opposite directions as said driving member is thus moved, thereby producing a reversal in the direction of movement of said driven member for a given direction of movement of said driving member depending upon which of said selectively engageable parts is operative.

8. The camera of claim 6, in which said driving member is movable between first and second positions and said selectively usable parts on said one of said members are so positioned thereon as to be moved different distances as said driving member is thus moved, thereby producing a difference in the amount of movement of said driven member for a given amount of movement of said driving member depending upon which of said selectively engageable parts is operative.

9. The camera of claim 6, in which said driving member is movable between first and second positions and said selectively usable parts of said one of said members are so positioned thereon as to be moved different distances in opposite directions as said driving member is thus moved, thereby producing reversal in the direction of movement of said driven member for a given direction of movement of said driving member and a difference in the amount of movement of said driven member for a given direction of movement of said driving member depending upon which of said selectively engageable parts is operative.

10. In a camera comprising a casing, a zoom lens having a movable element for changing the focal length thereof, a view finder having a movable element for changing the condition thereof, and linkage means operatively connected to said zoom lens element and to said view finder element for adjustably and cooperatingly varying the condition of said zoom lens and said view finder; the improvement which comprises said linkage means comprising a driving member adapted to be adjustably positioned, a first driven member operatively connected to said zoom lens element for altering the condition of said zoom lens, a second driven member operatively connected to said view finder element for altering the condition of said view finder, a first connecting element operatively connected between said driving member and said first driven member, said operative connection between said first connecting element and said members operatively connected thereto comprising engageable and disengageable parts including a plurality of selectively usable parts on one of said members which are respectively positioned at a plurality of locations thereon, thereby to produce different positioning of said zoom lens element in accordance with given positioning of said driving member depending upon which of said selective engaging means is operative, a second connecting element operatively connected between said driving member and said second driven member, said operative connection between said connecting element and said members operatively connected thereto comprising engageable and disengageable parts including a plurality of selectively usable parts on one of said members which are respectively positioned at a plurality of locations thereon, thereby to produce different positioning of said view finder element in accordance with the given positioning of said driving member depending upon which of said second mentioned selective engaging means is operative.

11. The camera of claim 10, in which said driving member is movable between first and second positions and said selectively usable parts on said one of said members are so positioned thereon as to be moved in opposite directions as said driving member is thus moved, thereby producing a reversal in the direction of movement of the corresponding driven member for a given direction of movement of said driving member depending upon which of said selectively engageable parts is operative.

12. The camera of claim 6, in which said driving member is movable between first and second positions and said selectively usable parts on said one of said members are so positioned thereon as to be moved in opposite directions as set driving member is thus moved, thereby producing a difference in the amount of movement of the corresponding driven member for a given amount of movement of said driving member depending upon which of said selectively engageable parts is operative.

13. In a camera comprising a casing, a zoom lens having a movable element for changing the focal length thereof, and a linkage operatively connected to said zoom lens element for adjustably varying the condition of said zoom lens; the improvement which comprises said linkage comprising a driving member rotatable about an axis and adapted to be adjustably positioned, a driven member overlying said driving member and operatively connected to said zoom lens element for altering the condition of said zoom lens, a connecting element, means on said driving member for selectively mounting said connecting element thereon in a plurality of positions differently located relative to the axis of rotation of said driving member, said driven member having slot means thereon through which said connecting element passes for all operative positions of said driving member and for all operative mounting locations of said connecting element on said driving member, said driving and driven members being operatively connected via the cooperation between said connecting element and said slot means, thereby to produce different positioning of said zoom lens element in accordance with given positioning of said driving member depending at least in part upon the location of said connecting element on said driving member.

14. The camera of claim 13, in which said connecting element mounting means are located on opposite sides of the axis of rotation of said driving member as to produce a reversal in the direction of movement of said driven member for a given direction of movement of said driving member depending upon the one of said mounting means with which said connecting element is operatively associated.

15. The camera of claim 13, in which said connecting element mounting means are located at different distances from the axis of rotation of said driving member as to produce a difference in the amount of movement of said driven member for a given amount of movement of said driving member depending upon the one of said mounting means with which said connecting element is operatively associated.

16. In the camera of claim 13, a view finder having a movable element for changing the condition thereof, and an operative connection between said driving member and said view finder element for positioning the latter in accordance with the position of the former.

17. The camera of claim 16, in which said operative connection between said driving member and said view finder element comprises a driven member overlying said driving member and operatively connected to said view finder element, a connecting element, means on said driving member for selectively mounting said connecting element thereon in a plurality of locations, said driven member having slot means through which said connecting element passes for all operative positions of said driving member and for all operating mounting locations of said connecting element on said driving member, said driving and driven members being operatively connected via the cooperation between said connecting element and said slot means.

18. A camera comprising a casing, a zoom lens mounted thereon, lens actuating means operatively connected to said zoom lens for actuating the latter to vary the focal length thereof, a pair of finger pieces mounted on said casing, located immediately adjacent one another so as to be manipulatable by the fingers of one hand, and exposed at the exterior of said casing for manual manipulation, said finger pieces being mounted on said casing to move in parallel paths, and means operatively connecting said finger pieces to one another and to said lens actuating means for simultaneous movement of said finger pieces in opposite directions and simultaneous progressive operation of said lens actuating means in accordance with said movement of said finger pieces as that movement progresses, and at a speed positively related to the speed of movement of said finger pieces.

19. A camera comprising a casing, a zoom lens mounted thereon, lens actuating means operatively connected to said zoom lens for actuating the latter to vary the focal length thereof, a pair of finger pieces mounted on said casing, located immediately adjacent one another so as to be manipulatable by the fingers of one hand, and exposed at the exterior of said casing for manual manipulation, said finger pieces being mounted on said casing to move in parallel paths vertically disposed relative to said casing, and means operatively connecting said finger pieces to one another and to said lens actuating means for simultaneous movement of said finger pieces in opposite directions and simultaneous progressive operation of said lens actuating means in accordance with said movement of said finger pieces as that movement progresses, and at a speed positively related to the speed of movement of said finger pieces.

20. The camera of claim 18, in which said zoom lens extends from one wall of said casing and in which said finger pieces are mounted on said casing remote from said zoom lens and on a wall other than said one wall.

21. The camera of claim 19, in which said zoom lens extends from one wall of said casing and in which said finger pieces are mounted on said casing remote from said zoom lens and on a wall other than said one wall.

References Cited in the file of this patent

UNITED STATES PATENTS

| | | |
|---|---|---|
| 1,157,310 | Klein | Oct. 19, 1915 |
| 1,275,863 | Davis | Aug. 13, 1918 |
| 1,790,232 | Flora | Jan. 27, 1931 |
| 1,950,166 | Durholz | Mar. 6, 1934 |
| 2,159,394 | Mellor et al. | May 23, 1939 |
| 2,454,686 | Back | Nov. 23, 1948 |
| 2,860,560 | Traino et al. | Nov. 18, 1958 |
| 2,940,373 | Berg et al. | June 14, 1960 |
| 2,945,415 | Bechtold et al. | July 19, 1960 |

FOREIGN PATENTS

| | | |
|---|---|---|
| 23,388 | Great Britain | Dec. 1, 1914 |

OTHER REFERENCES

Article, "Movies, What New?" Popular Photography, January 1960, p. 132.